April 17, 1928.  1,666,138
G. R. HOUGHTALING
ORNAMENTED ARTICLE AND METHOD OF MAKING THE SAME
Filed Jan. 11. 1926
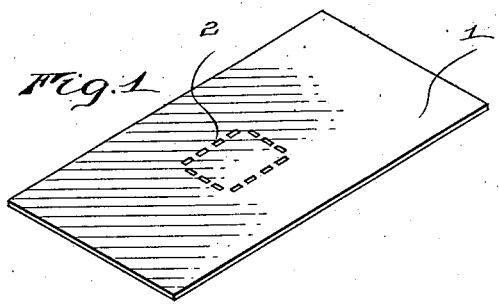
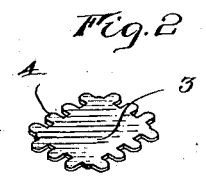
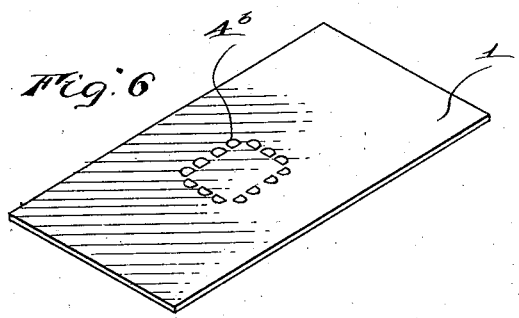
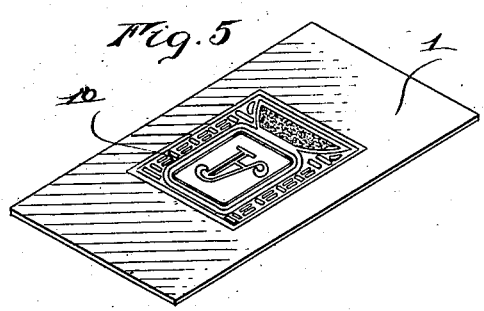
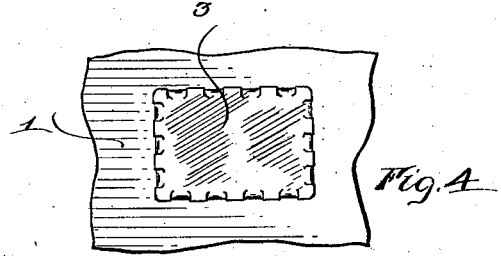
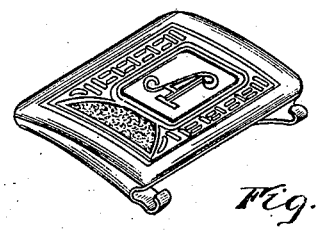
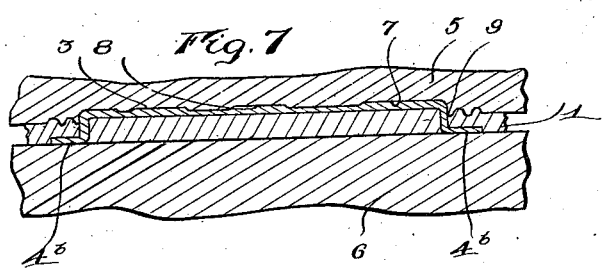
INVENTOR
Guy R. Houghtaling.
BY
Davis & Simms
his ATTORNEYS.

Patented Apr. 17, 1928.

1,666,138

UNITED STATES PATENT OFFICE.

GUY R. HOUGHTALING, OF ROCHESTER, NEW YORK, ASSIGNOR TO HICKOK MANUFACTURING COMPANY, INC., OF ROCHESTER, NEW YORK.

ORNAMENTED ARTICLE AND METHOD OF MAKING THE SAME.

Application filed January 11, 1926. Serial No. 80,489.

The present invention relates to ornamented articles and to a method of making the same, an object of this invention being to provide an article formed of two metal parts so united that the connecting means between them is not visible from the face of the article, while, at the same time, the connection is effected without soldering and in a way which is inexpensive to manufacture. Another object of the invention is to flow one metal on the face of another within a predetermined area so that a neat and regular dividing line between the two pieces is formed. Still another object of the invention is to provide for uniting two metal parts, reshaping the edges of one of them and ornamenting the other in one operation.

With these and other objects in view the invention consists in the steps and devices hereinafter set forth and as particularly pointed out in the appended claims.

In the drawings:

Fig. 1 is a perspective view of the main or body part after the latter has been provided with the continuous series of openings;

Fig. 2 is a perspective view of the other part after it has been cut to provide the securing prongs;

Fig. 3 is a perspective view showing the part illustrated in Fig. 2 after the securing prongs have been bent laterally;

Fig. 4 is a plan view showing the two parts connected before the pressure is applied;

Fig. 5 is a view showing the parts after the pressure takes place;

Fig. 6 is a rear view of the parts after the operation shown in Fig. 5 has been performed;

Fig. 7 is a sectional view showing the operation of the dies for forming the article as shown in Fig. 5; and Fig. 8 is a perspective view of a belt buckle frame made from the article as shown in Fig. 5.

In carrying out this invention a sheet metal plate 1 preferably of soft material such as bronze is provided with a continuous series of elongated rectangular openings 2. A second piece of metal is cut preferably from soft material such as silver to provide a blank such as illustrated in Fig. 2, comprising a central portion 3 with marginal prongs 4 in the same plane therewith. The prongs 4 are then bent laterally as illustrated at $4^a$ in Fig. 3 and these lateral prongs which are spaced apart the same distance as the openings 2 and have the same cross section are then introduced into the openings 2, so that the prongs $4^a$ project on the opposite side of the piece 1. Owing to the fact that the prongs 4 are bent from the central portion 3, the edge of the insert when viewed from the face is notched or recessed slightly. The prongs after insertion in the openings of the plate 2 are deflected outwardly to a small extent. The two pieces are now subjected to pressure between two dies 5 and 6 of which only portions are shown. The die 6 is preferably flat and cooperates with the prongs $4^a$ to bend them outwardly as shown at $4^b$, Fig. 7, and the pressure between the dies is such that these prongs are forced into the soft metal of the main part 1 as illustrated in Fig. 7. The die 5 is formed with a central pocket 7, the area of which is slightly greater than the area of the main portion 3, this central pocket having, if desired, an ornamental figure 8 at its center which will cooperate with the outer surface of the part 3 to ornament the latter. The die 5 also has surrounding the pocket 7 a marginal lip 9 which conforms to the outline of the piece 3 and forms a groove in the piece 1 immediately about the piece 3. The die 5 may have any other ornamentation such, for instance, as will produce the design 10 on the piece 1. When the two die members are brought together the prongs on the member 3 are forced into the soft metal of the part 1 and the metal of the part 3 flows under the compression until it reaches the inner surface of the projection 9, such inner surface limiting the flowing and producing a uniform edge on the part 3, this having, as before pointed out, to a certain extent, been irregular due to the fact that the outer faces of the prongs lie outwardly beyond the inner ends of the notches between the prongs. As a result after the flowing of the plate 3 within the area defined by the rib or lip 9 the edge of the plate 3 is coincident with the edge of the prongs and also with the wall of the groove or depression formed by the rib 9 in the piece 1.

What I claim as my invention and desire to secure by Letters Patent is:

1. An ornamental article comprising a piece formed of soft sheet metal and having an opening therein and an endless groove and an insert formed of soft sheet metal lying in flowed intimate contact with the first mentioned piece, and having its marginal edges flowed and coincident with the inner wall of the endless groove of the first mentioned piece, said insert having a prong extending therefrom through the opening of the first mentioned piece and deflected on the rear face of the latter.

2. An ornamental article comprising two sheet metal pieces of soft material having opposed flat faces lying in flowed intimate contact, one of said pieces being larger in area than the other and formed with an endless series of openings and the other having marginal prongs extending through said openings with their ends embedded in and flush with the rear face of the piece of larger area, the piece of larger area having an endless groove on that face on which the small member is arranged, the metal of the piece of smaller area being flowed and extending to the inner wall of said groove.

3. An ornamental article comprising a sheet metal piece formed with an endless series of openings, and a second sheet metal piece of soft material having marginal prongs extending through said openings, and bent on the opposite face of the first mentioned sheet metal piece, the second mentioned sheet metal piece lying in flowed intimate contact throughout its rear side with the face of the first mentioned sheet metal piece.

4. An ornamental article comprising two sheet metal pieces of soft material having opposed flat faces lying in intimate contact, one of said pieces being larger in area than the other and formed with an endless series of openings and the other having marginal prongs extending through said openings with their ends embedded in and flush with the rear face of the piece of larger area, the piece of larger area having an endless groove on that face on which the small member is arranged, the metal of the piece of small area extending to the inner wall of said groove.

GUY R. HOUGHTALING.